(12) United States Patent
Hulmani et al.

(10) Patent No.: US 7,660,357 B2
(45) Date of Patent: *Feb. 9, 2010

(54) PES DATA PROCESSING

(75) Inventors: Girish Hulmani, Bangalore (IN); Syed Mohammed Ali, Bangalore (IN); Arul Thangaraj, Bangalore (IN); Sandeep Bhatia, Bangalore (IN); Pramod Chandriah, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1236 days.

This patent is subject to a terminal disclaimer.

(21) Appl. No.: 10/610,149

(22) Filed: Jun. 30, 2003

(65) Prior Publication Data

US 2004/0190630 A1 Sep. 30, 2004

Related U.S. Application Data

(60) Provisional application No. 60/459,188, filed on Mar. 31, 2003.

(51) Int. Cl.
*H04N 7/12* (2006.01)
(52) U.S. Cl. ............................... 375/240.26
(58) Field of Classification Search ............ 375/240.01, 375/240.26, 240.28, 262; 370/474; *H04N 7/12*
See application file for complete search history.

(56) References Cited

U.S. PATENT DOCUMENTS

| 6,744,789 B1* | 6/2004 | Michener ................. 370/474 |
| 6,782,056 B1* | 8/2004 | Poslinski et al. ............ 375/262 |
| 2004/0004560 A1 | 1/2004 | Okamoto et al. |

* cited by examiner

*Primary Examiner*—Young Lee
(74) *Attorney, Agent, or Firm*—McAndrews, Held & Malloy Ltd

(57) ABSTRACT

A system and method for detecting PES headers is presented herein. PES headers are detected by a combination of hardware and firmware. Hardware logic is used to detect the PES start codes while multithreaded firmware us used to process the packet.

11 Claims, 4 Drawing Sheets

PES DATA PROCESSING

RELATED APPLICATIONS

This application claims priority to Provisional Application for Patent, Ser. No. 60/459,188, "PES Data Processing", filed by Girish Hulmani, on Mar. 31, 2003, which is incorporated by reference herein. This application is also related to Patent Application, Ser. No. 10/610,246, "PBS Data Processing", filed by Hulmani, et al., on Jun. 30, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The output of an MPEG Audio or Video Encoder is called an elementary stream. An elementary stream is a compressed representation of the audio or video source and may be broken into data blocks of manageable size, forming a packetized elementary stream (PES). The data blocks, known as PES packets, include PES header information to identify the start of the packets. Additionally, the packets also include time stamps, known as presentation time stamps (PTS), and decode time stamps (DTS) because packetizing can disrupt synchronization.

For transmission and digital broadcasting, several programs and their associated PES can be multiplexed into a single transport stream. The transport stream differs from a program stream in that the ES packets are further subdivided into short fixed-size packets of 188 bytes. Additionally, transport streams can carry multiple programs encoded with different clocks. The transport stream comprises fixed size data packets containing 188 bytes.

While the PES stream is packetized into 188 byte transport packets, PES packets do not have a fixed length. PES headers can start anywhere and any number of times with a 188-byte transport packet. Additionally, PES headers can also straddle across 188-byte transport packet boundaries. The foregoing makes PES header detection complex.

Some systems implement PES header detection in firmware. Implementation of PES header detection in firmware consumes significant processor bandwidth, thus limiting the bit rate handling capability of the video transport processor.

Alternatively, PES header detection can be handled in hardware. However, PES header detection in hardware is unable to detect PES headers that straddle transport packets. Accordingly, detection of PES headers that straddle transport packets is still handled in firmware.

Further limitations and disadvantages of convention and traditional approaches will become apparent to one of skill in the art, through comparison of such systems with embodiments of the present invention as set forth in the remainder of the present application with reference to the drawings.

BRIEF SUMMARY OF THE INVENTION

A system, method, and apparatus for detection of PES headers are presented herein. PES header detection is accomplished by a combination of hardware and firmware effort. Hardware logic is used to detect the PES start codes while multithreaded firmware us used to process the packet.

In one embodiment, a state logic machine detects PES headers of incoming PES packets from multiple PESs. Upon detecting a PES header, the state logic machine interrupts a processor. The processor maintains a separate execution thread for each of the different PESs. Responsive to the interrupt, the processor identifies the PES for the PES packet and loads the context associated with the PES. When the processor finishes processing the packet, the processor stores the context for use when another PES packet from the PES is detected.

In another embodiment, the processor maintains a context table wherein PES contexts are stored and associated with PES identifiers. When a PES associated with a PES packet is identified, the PES identifier is used to identify the correct context for the PES. When the processor finishes processing the PES packet, the processor stores an updated context in the context table.

These and other advantages and novel features of the present invention, as well as illustrated embodiments thereof will be more fully understood from the following description and drawings.

DETAILED DESCRIPTION OF THE INVENTION

Figure 1:
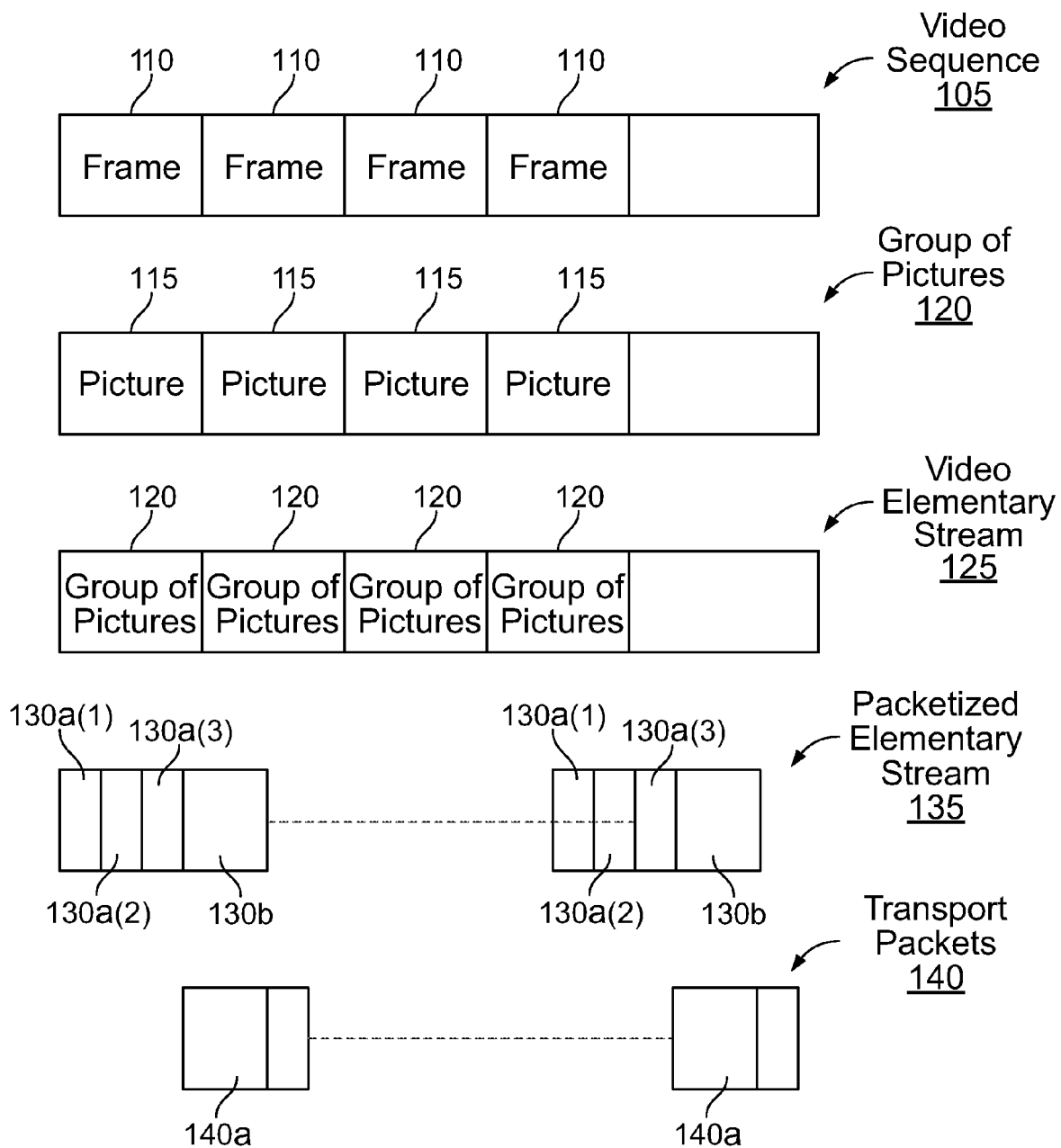
FIG. 1 is a block diagram of an exemplary transport stream in accordance with an embodiment of the present invention.

Referring now to FIG. 1, there is illustrated a block diagram describing MPEG formatting of a video sequence 105. A video sequence 105 comprises a series of frames 110. In a progressive scan, the frames 110 represent instantaneous images, while in an interlaced scan, the frames 110 comprises two fields each of which represent a portion of an image at adjacent times. Each frame is represented by a data structure known as a picture 115. The pictures 115 are then grouped together as a group of pictures 120. Groups of pictures 120 are then stored, forming what is known as a video elementary stream 125.

The video elementary sequence 125 is then broken into variable size segments that are packetized, forming packetized elementary stream (PES) packets 130. Each PES packet 130 includes a PES header 130a, and a payload 130b. The PES header 130a comprises several fields, including a PES start code 130a(1), a stream identifier (stream_id) 130a(2), and a packet length 130a(3) which indicates the length of the packet. The payload 130b comprises a particular segment of the video elementary stream 125a. The PES packets 130 together form a PES 135.

A video PES 135 can have a number of audio PESs 135 and data PESs 135, associated therewith. For example, a movie can be represented by a video PES 135, two audio PESs 135 representing stereo signals, and a data PESs 135 for providing subtitles. A program stream is a PES packet 130 multiplex that carries multiple PESs that were encoded using the same master clock or system time clock.

Any number of program streams can be multiplexed together for transport over a transmission over a communication channel. Each program may use a different compression factor and bit rate that can change dynamically even though the overall bit rate stays constant. The foregoing is known as statistical multiplexing. A decoder must be able to change from one program to the next and correctly select the appropriate audio and data channels.

The PES 135 is then broken into fixed length segments. In MPEG-2, the fixed length is usually 188 bytes. Each fixed length segment forms a payload 140a portion of a transport packet 140. The transport packet 140 also includes a header 140b with various parameters. Among the parameters is a packet identification (PID) 140b(1) that distinguishes different types of packets. In a given transport stream, all packets belonging to a given elementary stream will have the same PID 140b(1). The transport packets 140 are transported over a communication channel for decoding by a decoder.

While the PES stream is packetized into 188 byte transport packets, PES packets 130 do not have a fixed length. PES headers can start anywhere and any number of times with a 188-byte transport packet. Additionally, PES headers can also straddle across 188-byte transport packet boundaries.

The PES header detection can be accomplished by a combination of hardware and software. The hardware can be used to detect PES start codes 130a(1), while a processor executing instructions in software can process detected PES packets. The processor can handle multiple different PES by processing each PES as a separate thread. When the hardware detects a PES start code 130a(1), the hardware interrupts the processor. Responsive to the interrupt, the processor processes the PES packet 130 until the end of the PES packet.

Figure 2:
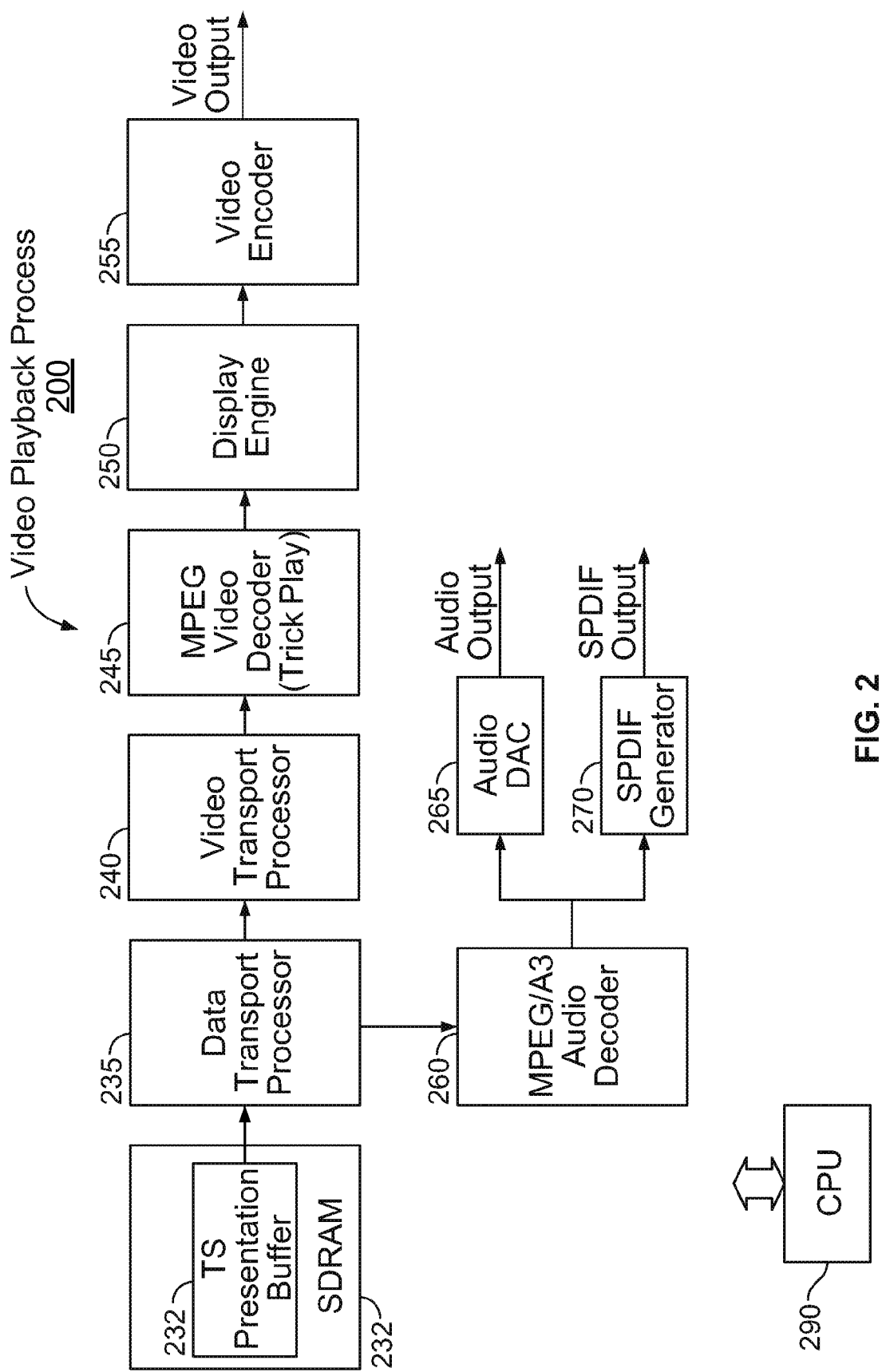
FIG. 2 is a block diagram of an exemplary video decoder in accordance with an embodiment of the present invention.

Referring now to FIG. 2, there is illustrated a block diagram of an exemplary decoder in accordance with an embodiment of the present invention. Data is output from buffer 232 within SDRAM 230. The data output from the presentation buffer 232 is then passed to a data transport processor 235. The data transport processor 235 demultiplexes the transport stream into packetized elementary stream constituents, and passes the audio transport stream to an audio decoder 260 and the video transport stream to a video transport decoder 240 and then to a MPEG video decoder 245. The audio data is then sent to the output blocks, and the video is sent to a display engine 250. The display engine 250 scales the video picture, renders the graphics, and constructs the complete display. Once the display is ready to be presented, it is passed to a video encoder 255 where it is converted to analog video using an internal digital to analog converter (DAC). The digital audio is converted to analog in an audio digital to analog (DAC) 265.

Figure 3:
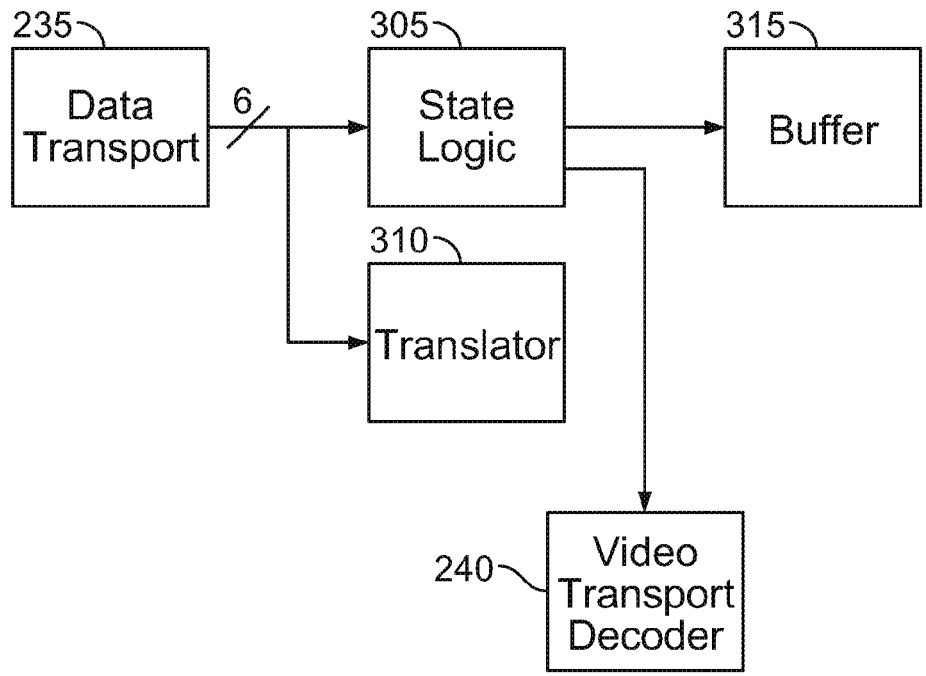
FIG. 3 is a block diagram of an exemplary video transport processor in accordance with an embodiment of the present invention.

Referring now to FIG. 3, there is illustrated a block diagram of an exemplary video transport decoder 240. The video transport decoder 235 can handle multiple stream formats which includes unbounded and bounded packetized elementary streams. There is a six-channel interface between the data transport 235 and the video transport decoder 240.

A translator 310 maps the six channels to three logical channels. The video transport decoder 240 includes a state machine 305 comprising logic to detect PES header 130a in incoming packetized elementary stream. The packetized elementary stream comes with a sync signal with the first byte of the PES start code 130a(1).

The state machine 305 can operate in one of two modes. In the default mode, the hardware breaks the PES into 188 byte sized packets and sets a status flag to indicate whether there is a PES start code 130a(1) in the 188 byte sized packets. The packets are stored in a buffer 315. In the second mode of operation, the state machine 305 breaks the PES stream at the beginning of every PES start code 130a(1) and places each string in a different buffer 315.

Upon detecting a PES start code 130a(1), the state machine 305 interrupts the video transport decoder 240. The video transport decoder 240 maintains the processing of each of the logical channels as a separate thread of operation. Each thread stops when a packet finishes and restarts at the beginning of the next packet with the same packet identifier (PID).

Responsive to receiving the interrupt, the video transport decoder 240 parses the PES header 130a and examines the stream_id 130a(2) parameter. The video transport decoder 240 looks up the stream_id 130a(2) parameter in a context information table which correlates the stream_id 130a(2) parameter to context information associated with the stream. The context information is then used during the thread for processing the PES.

Figure 4:
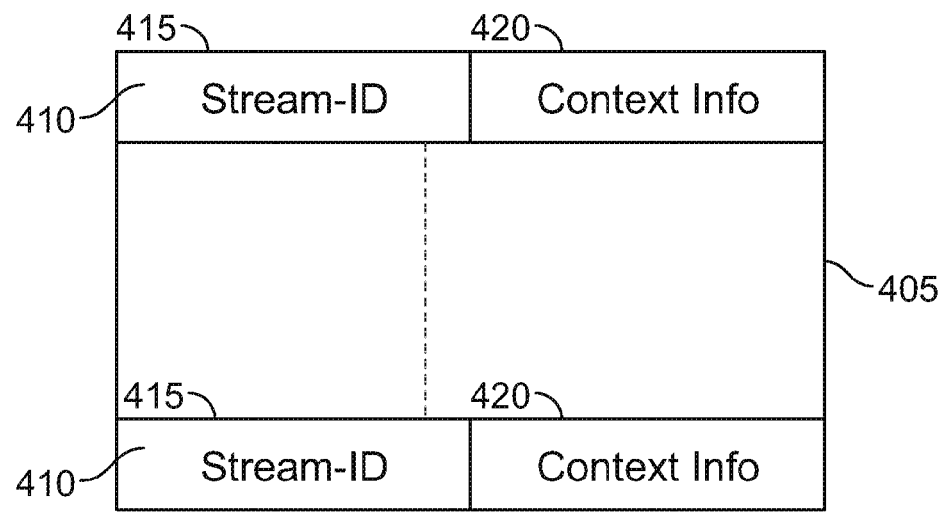
FIG. 4 is a block diagram of an exemplary packet identification context table in accordance with an embodiment of the present invention.

Referring now to FIG. 4, there is illustrated a block diagram of an exemplary context information table 405. The context information table 405 includes records 410 comprising stream_id 415 and context information 420, wherein the context information 420 is the context of the thread for the elementary stream associated with the stream_id. When the video transport decoder 240 retrieves a stream_id 130a(1) from a PES header 130a, the video transport decoder 240 determines the context associated with the stream_id 130a(1) by looking up the stream_id in the context information table 405. Upon finding a record 410 with the same stream_id 415, the video transport decoder 240 retrieves and loads the context information 420 from the record 410. When the video transport decoder 240 finishes processing a packet, the video transport decoder 240 looks up the stream_id 130a(1) in the context information table 405, retrieves a record 410 containing the same stream_id 415 and replaces the context information 420 with the context when the decoder finished processing the packet.

Figure 5:
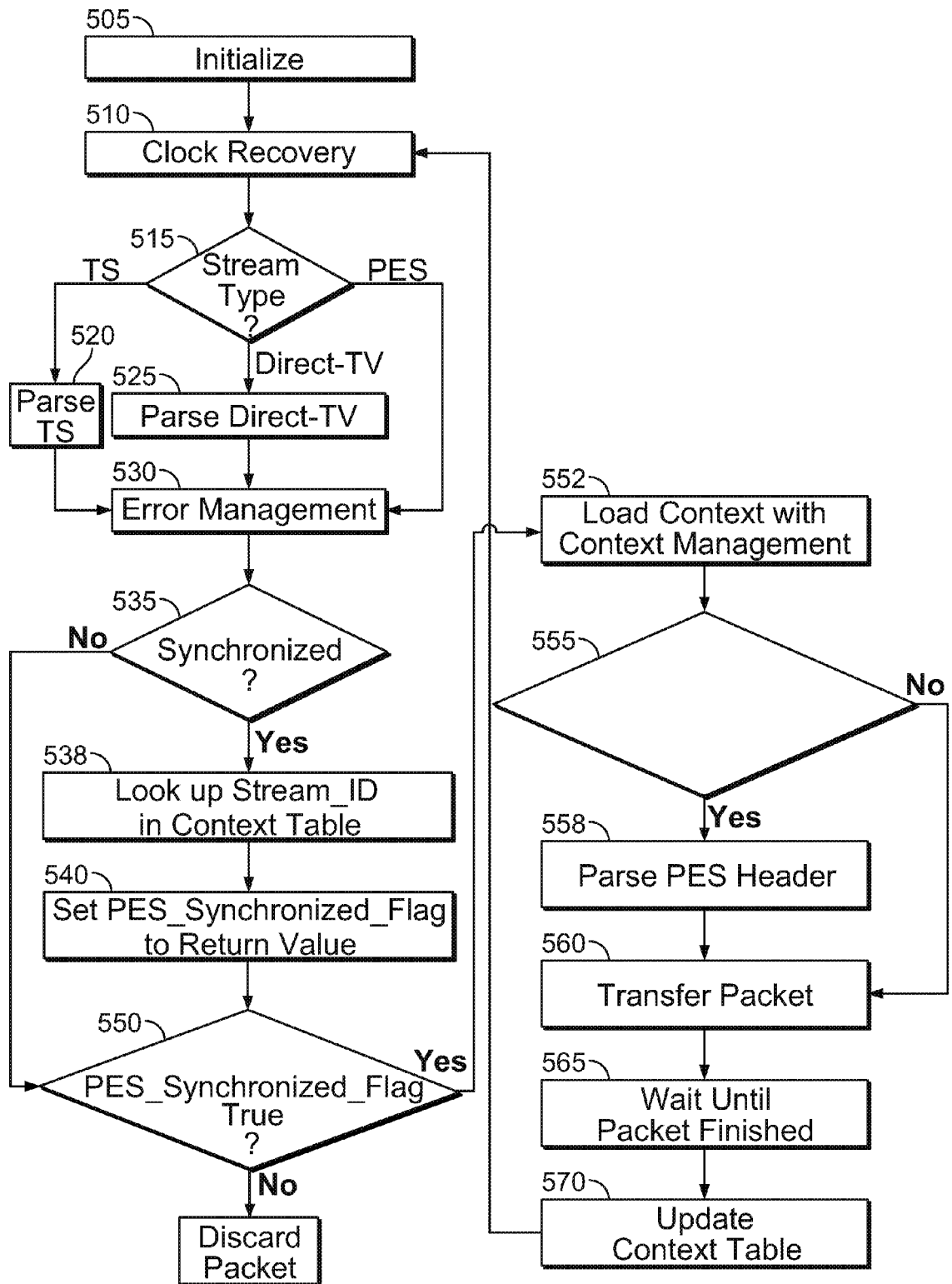
FIG. 5 is a flow diagram for processing a packetized elementary stream in accordance with an embodiment of the present invention.

Referring now to FIG. 5, there is illustrated a flow diagram for processing packetized elementary streams in accordance with an embodiment of the present invention. At 505, the video transport decoder 240 initializes and clock recovery and pause/resume for playback occur at 510. At 515, the video transport decoder 240 determines the stream type that is received. If the stream type during 515 is a transport stream, the video transport decoder 240 parses 520 the transport stream header and an error management function is invoked at 530. If the stream is a Direct TV stream, the video transport decoder 240 parses 525 the Direct TV header and an error management function is invoked at 530. If the stream type is a PES, 520-530 are bypassed.

At 535 the video transport decoder 240 determines whether or not the stream is synchronized. If at 530, the stream is synchronized, the video transport decoder 240 looks up the stream_id 130a(2) in the context table at 535 and during 540, the video transport decoder sets the PES_synchronized_flag to a return value. If the stream is not synchronized during 535, 538 and 540 are skipped.

At 550, a determination is made whether the PES_synchronized_flag is true. If at 550, PES_synchronized_flag is false, the packet is discarded and the next packet is examined (552) and 510 is repeated.

If at 550, the PES_sycnhronized_flag is true, the context associated with the stream_id 130a(2) in the context table during 535 is loaded, using context management (552). At 555, a determination is made whether PES_hdr_Parsing_in_prg is true. If at 555, PES_hdr_Parsing_in_prg is true, the PES header 130*a* is parsed (558). If at 555, PES_hdr_Parsing_in_prg is false, 555 is bypassed. At 560, the packet transfer is initiated and at 565, the video transport decoder waits until the packet is finished. At the end of the packet, the context table is updated with the new context information (570) and 510 are repeated.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein the flow diagram of FIG. 5 is implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for processing packets, said system comprising:
  state logic for detecting headers associated with the packets;
  a processor for loading contexts responsive to the state logic detecting the headers; and
  a buffer for storing the packets; and
  wherein the state logic interrupts the processor, responsive to detecting the headers.

2. The system of claim 1, wherein the packets comprise identifiers, and wherein the processor loads contexts associated with the identifiers.

3. The system of claim 2, wherein the processor stores contexts, responsive to detecting the end of the packets.

4. The system of claim 3, wherein the processor associates the stored contexts with the identifiers in the packets.

5. The system of claim 1, wherein the packets and the headers associated with the packets are carried in at least one payload of at least one transport stream packet, and wherein the headers comprise PES headers.

6. A method for processing packets comprising:
  detecting PES headers associated with the packets;
  loading contexts responsive to detecting the PES headers;
  storing the packets; and
  generating an interrupt, responsive to detecting the PES headers.

7. The method of claim 6, wherein the packets comprise identifiers, and wherein loading the contexts further comprises loading the context associated with the identifiers.

8. The method of claim 7, further comprising:
  storing contexts, responsive to detecting the end of the packets.

9. The method of claim 8, further comprising associating the stored contexts with the identifiers in the packets.

10. The method of claim 6, wherein the packets and the PES headers associated with the packets are carried in at least one payload of at least one transport stream packet.

11. A method for processing packets comprising:
  detecting headers associated with the packets;
  loading contexts responsive to detecting the headers; and
  storing the packets; and
  wherein the packets and the headers associated with the packets are carried in at least one payload of at least one transport packet.

* * * * *

UNITED STATES PATENT AND TRADEMARK OFFICE
CERTIFICATE OF CORRECTION

PATENT NO. : 7,660,357 B2  Page 1 of 1
APPLICATION NO. : 10/610149
DATED : February 9, 2010
INVENTOR(S) : Hulmani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,357 B2 | Page 1 of 1 |
| APPLICATION NO. | : 10/610149 | |
| DATED | : February 9, 2010 | |
| INVENTOR(S) | : Hulmani et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Thirty-first Day of May, 2011

David J. Kappos
*Director of the United States Patent and Trademark Office*